(Model.) 2 Sheets—Sheet 1.

J. ROGERS.
MACHINE FOR GRINDING MOWING MACHINE KNIVES.

No. 370,658. Patented Sept. 27, 1887.

Witnesses.
L. L. Gardner
Edw. P. Ellis.

Inventor.
Jno. Rogers,
per F. A. Lehmann, atty

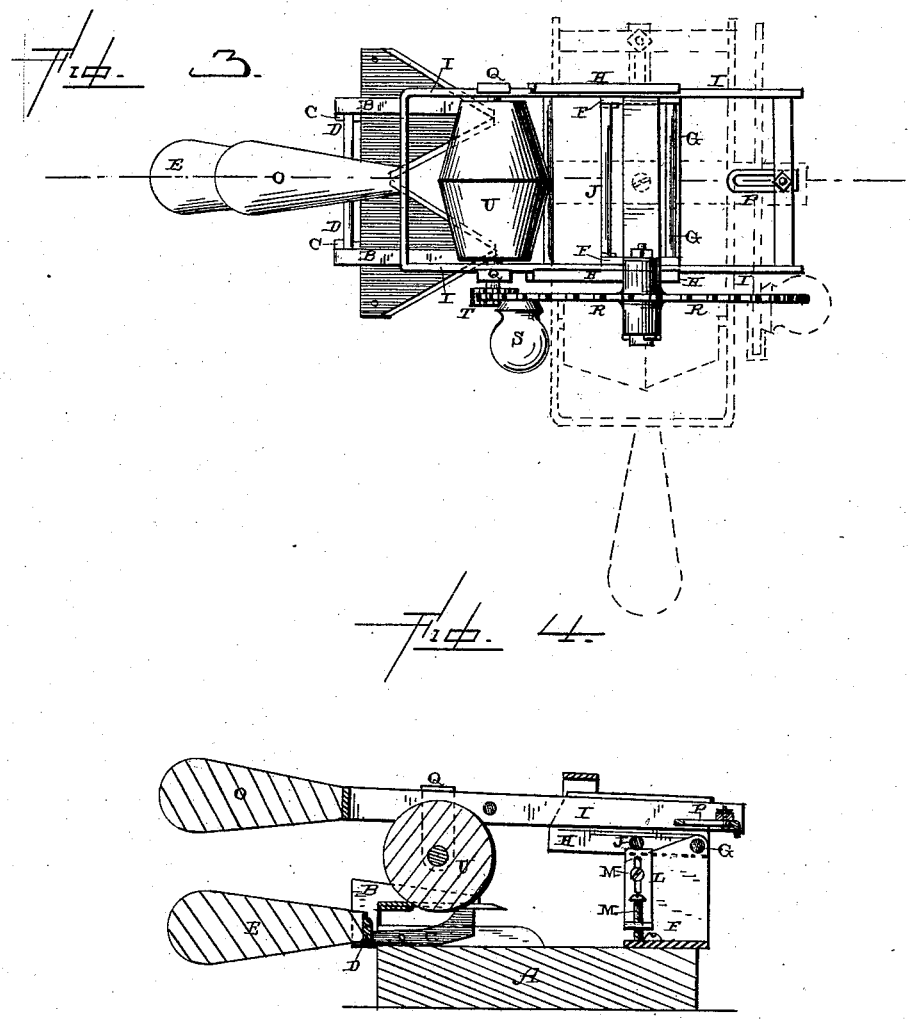

UNITED STATES PATENT OFFICE.

JOHN ROGERS, OF ELKHART, INDIANA.

MACHINE FOR GRINDING MOWING-MACHINE KNIVES.

SPECIFICATION forming part of Letters Patent No. 370,658, dated September 27, 1887.

Application filed May 31, 1887. Serial No. 239,889. (Model.)

*To all whom it may concern:*

Be it known that I, JOHN ROGERS, of Elkhart, in the county of Elkhart and State of Indiana, have invented certain new and useful Improvements in Machines for Grinding Mowing-Machine Knives; and I do hereby declare the following to be a full, clear, and exact description of the invention, such as will enable others skilled in the art to which it pertains to make and use it, reference being had to the accompanying drawings, which form part of this specification.

My invention relates to an improvement in machines for grinding mowing-machine knives; and it consists in, first, the combination of the bed-piece, the stationary U-shaped part of the clamp, the clamping-levers, which are pivoted to the stationary part, and the cam or lever, also pivoted in the stationary part of the clamp, and which bears downward upon the top of the two levers, pivoted in the U-shaped clamp, for the purpose of clamping the knife rigidly in position while being sharpened; second, the combination of the U-shaped supporting-frame, which is pivoted upon the bed-piece so as to be turned freely around, the pivoted guides, which are attached to the upper corner of this pivoted frame, devices for regulating the distance the guides shall move downward, and the sliding frame, which carries the grinder and the operating mechanism therefor, and which moves back and forth through the guides; third, the arrangement and combination of parts, which will be more fully described hereinafter, and set forth in the claims.

The object of my invention is to provide a machine for grinding mowing-machine knives, in which the operating mechanism is placed in pivoted guides, so that the grinder can be moved freely back and forth over the top of the knife which is to be sharpened; to place the frame of the operating mechanism in pivoted guides, so that the grinder can be turned up out of the way; and to provide the pivoted supporting-frame with adjustable supports which will regulate the distance that the grinder shall drop downward while in operation.

Figure 1:
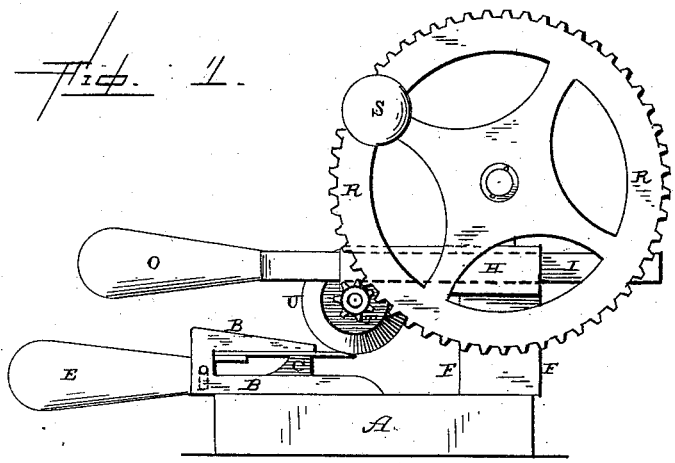
Figure 2:
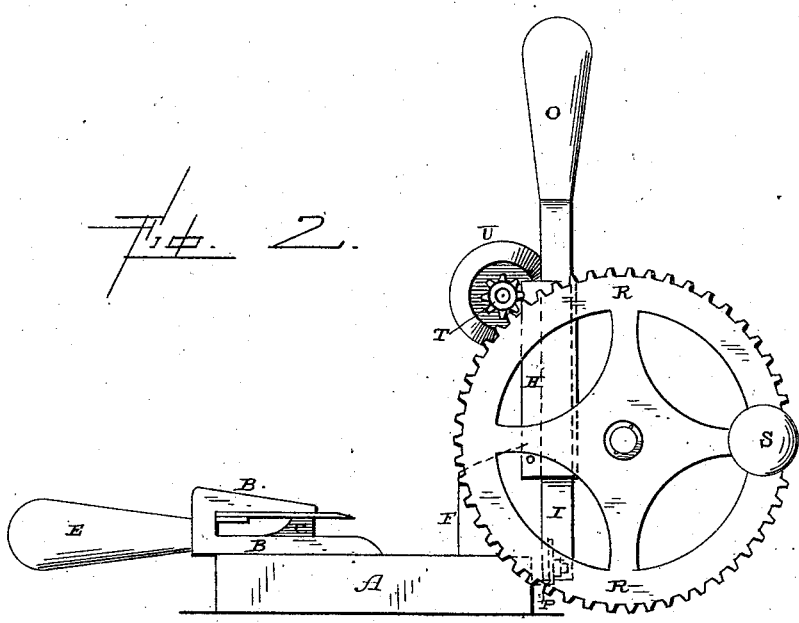

Figure 1 is a side elevation of a machine embodying my invention. Fig. 2 is a similar view showing the grinder turned back out of the way. Fig. 3 is a plan view. Fig. 4 is a longitudinal vertical section taken through the center of the frame.

A represents the bed-piece, which will be of any suitable size, and upon the top of this bed-piece is rigidly secured the U-shaped portion B of the clamp. The upper shorter arm of this portion B rests upon the top of the knife, as shown, while the lower arms do not come in contact with the knife at all, but serve simply as supports to which the pivoted clamping-levers C are fastened. The inner ends of these levers C, which are pivoted to the inner sides of the portions B, bear directly against the under side of the knife, while their outer ends are so shaped that the cam D, to which the operating-lever E is secured, will bear downward upon them and force the inner ends upward against the under side of the knife. The two levers C and the cam D force the knife upward against the under side of the upper portion of the stationary part B of the clamp, and thus hold it rigidly in position to be operated upon by the grinder. Whenever it is necessary to loosen the knife for any purpose, it is only necessary to raise the lever E upward, when the pressure of the cam will be taken from the outer ends of the lever C, when the knife can be moved freely endwise in either direction.

Pivoted upon the opposite end of the bed-piece A is the U-shaped frame F, which can be freely turned in any direction desired, so as to move the grinding mechanism either over the top of the knife or away from it, as may be necessary. Pivoted to the upper outer corners of this U-shaped frame F, by means of the rod G, are the two guides H, of suitable length, and through which the sliding frame I, carrying the grinding mechanism, moves back and forth. These two guides H are connected together by means of the cross-bar J, so that they will always move together, and which cross-bar J also serves to regulate the distance that the frame I shall allow the grinder to drop downward. Loosely connected to the inner sides of the pivoted frame F are the vertically-adjustable slotted guides L, which are both secured to the frame F and guided in their movements by the screws M. The lower ends of these guides L are turned horizontally inward, and through these inturned ends are passed the set-screws N, by means of which the guides L are adjusted so as to strike against the under side of the cross-bar J with their upper ends. These guides L are so adjusted that their upper ends will project far enough above the cut-away inner corner of the frame F that the cross-bar J will always rest upon them, and thus regulate the distance the grinder shall drop downward. The guides H, being pivoted upon the frame F, freely follow any movement of the frame I under any circumstances, no matter whether the frame is turned in a vertical or a horizontal position.

The frame I is preferably made rectangular in shape, and is moved back and forth through the guides H by means of the handle O, which is secured to one end. The distance the frame shall move through the guides is regulated by the adjustable stop P at one end and the boxes Q for the grinder at the other. When the frame I is drawn forward, the stop P strikes against the cross-bar G, and thus prevents any further motion of the grinder forward over the teeth of the cutter, and when the frame I is forced backward the boxes Q strike against the ends of the guides H. By adjusting the stop P the distance the frame shall move is always regulated to the length of the teeth which are to be sharpened. Journaled in suitable openings secured to this frame is a large driving-wheel, R, which is provided with a handle, S, and which wheel R meshes with the pinion T, secured directly to one end of the shaft of the grinder U. The wheel R being much larger than the pinion T, a very rapid motion is given to the grinder U when the wheel is caused to revolve. While the wheel R is being revolved with one hand the frame I is moved back and forth through the guides H, while the grinder U is in contact with the knife which is being sharpened.

While the knife is being adjusted to have its teeth sharpened the frame I and guides H can be turned into the vertical position shown, so as to have them out of the way. Should it not be desired to turn the frame I upward, as here shown, it can be swung around at right angles, so as to have it out of the way of the knife while being adjusted.

Having thus described my invention, I claim—

1. The combination of the U-shaped stationary casting B, the two levers C, pivoted to the parts B, and adapted to bear against the under side of the knife, and the cam D, provided with a handle and pivoted between the parts B, and adapted to bear down upon the outer ends of the levers C, so as to lock the knife in position, substantially as shown.

2. The combination of the bed-piece A, the frame F, the sliding frame I, the grinder, which is secured to the frame by suitable boxes, the adjustable stop, the pivoted guides through which the frame I moves back and forth, the cross-bar against which the stop strikes, and the operating mechanism for the grinder, substantially as set forth.

3. The combination of the frame F, the adjustable guides placed therein and the pivoted guides connected to the frame, the sliding frame carrying the grinder and its operating mechanism, and the cross-bar J, which rests upon the top of the guides, substantially as specified.

In testimony whereof I affix my signature in presence of two witnesses.

JOHN ROGERS.

Witnesses:
   JAMES H. STALE,
   LIVY CHAMBERLAIN.